United States Patent
Anderson et al.

(10) Patent No.: US 9,130,979 B2
(45) Date of Patent: Sep. 8, 2015

(54) SYSTEMS AND METHODS FOR USING VIRTUAL MACHINES TO SEQUENCE NATIVE APPLICATIONS INTO VIRTUAL PACKAGES AND FOR REIMAGING VIRTUAL MACHINES

(71) Applicant: Microsoft Corporation, Redmond, WA (US)

(72) Inventors: Adam Brady Anderson, Boston, MA (US); Meera Jindal, Medford, MA (US); Shruthi Achutha, Arlington, MA (US); Nikolaos Dalalelis, Burlington, MA (US); Hamid Palo, New York, NY (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 150 days.

(21) Appl. No.: 13/711,224

(22) Filed: Dec. 11, 2012

(65) Prior Publication Data

US 2014/0164480 A1    Jun. 12, 2014

(51) Int. Cl.
G06F 15/16      (2006.01)
H04L 29/08      (2006.01)
G06F 9/455      (2006.01)
H04L 29/06      (2006.01)
A63F 13/30      (2014.01)
A63F 13/355     (2014.01)

(52) U.S. Cl.
CPC .............. *H04L 67/141* (2013.01); *A63F 13/12* (2013.01); *A63F 13/355* (2014.09); *G06F 9/455* (2013.01); *G06F 9/45529* (2013.01); *H04L 29/08081* (2013.01); *H04L 67/10* (2013.01); *H04L 67/38* (2013.01); *H04L 69/08* (2013.01)

(58) Field of Classification Search
CPC ................................ H04L 69/08; G06F 9/455
USPC .................................. 717/176–178; 709/246
See application file for complete search history.

(56) References Cited

U.S. PATENT DOCUMENTS

| | | | |
|---|---|---|---|
| 7,987,432 B1 | 7/2011 | Grechishkin et al. | |
| 8,196,137 B2 | 6/2012 | Baker, III et al. | |
| 8,434,093 B2 * | 4/2013 | Larimore et al. | 719/312 |
| 8,645,977 B2 * | 2/2014 | Jacobson et al. | 719/328 |
| 8,677,345 B2 * | 3/2014 | Choi et al. | 717/174 |
| 2011/0072505 A1 | 3/2011 | Ott | |
| 2012/0159479 A1 | 6/2012 | Chardon et al. | |
| 2012/0226742 A1 | 9/2012 | Momchilov et al. | |
| 2012/0233610 A1 * | 9/2012 | Mandre | 718/1 |
| 2013/0247070 A1 * | 9/2013 | Larimore et al. | 719/312 |

(Continued)

OTHER PUBLICATIONS

"Flexera Software Solutions for Connecting Current to Cloud", Available at least as early as Sep. 17, 2012, Available at: http://www.flexerasoftware.com/products/cloud-solutions.htm.

(Continued)

*Primary Examiner* — Lance L Barry
(74) *Attorney, Agent, or Firm* — Nicholas Chen; Stein Dolan; Micky Minhas

(57) ABSTRACT

Providing virtual applications from a remote based system based on native applications. A method includes, at a remote based system, receiving a native application from an on-premises system remote from the remote based system. The method further includes at the remote based system, sequencing the native application into a virtual application. The method further includes providing the virtual application to a system different than the remote based system.

15 Claims, 8 Drawing Sheets

(56) References Cited

U.S. PATENT DOCUMENTS

2014/0101306 A1* 4/2014 Murgia .................... 709/224
2014/0164480 A1* 6/2014 Anderson et al. ............ 709/203

OTHER PUBLICATIONS

"Stoneware", Available at least as early as Sep. 17, 2012 Available at: http://stoneware-docs.s3.amazonaws.com/Lenovo%20SCA%20Whitepaper.pdf.

"International Search Report & Written Opinion for PCT Patent Application No. PCT/US2013/074501", Mailed Date: Apr. 8, 2014, Filed Date: Dec. 11, 2013, 11 Pages, (MS#337356.02).

"VMware ThinApp", Retrieved on: Sep. 17, 2012, Available at: http://www.vmware.com/files/pdf/thinapp/VMware-ThinApp-Datasheet.pdf.

"Flexera Software Solutions for Connecting Current to Cloud", Retrieved on: Sep. 17, 2012, Available at: http://www.flexerasoftware.com/products/cloud-solutions.htm.

"Stoneware", Retrieved on: Sep. 17, 2012, Available at: http://stoneware-docs.s3.amazonaws.com/Lenovo%20SCA%20Whitepaper.pdf.

Deng, et al., "Virtualization, Application Streaming and Private Cloud Computing in a Training Laboratory", In Journal of Software, vol. 5, Issue 11, Nov. 2010, 8 pages.

"Virtual Application Management with Microsoft Application Virtualization 4.5/4/6 and System Center Configuration Manager 2007 R2", Jan. 2010, Retrieved from the Internet at <<http://download.microsoft.com/download/F/7/8/F784A197-73BE-48FF-83DA-4102C05A6D44/App-V/App-V_and_ConfigMrg_Whitepaper_Final.docx>>.

* cited by examiner

SYSTEMS AND METHODS FOR USING VIRTUAL MACHINES TO SEQUENCE NATIVE APPLICATIONS INTO VIRTUAL PACKAGES AND FOR REIMAGING VIRTUAL MACHINES

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing systems ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing system.

Interconnection of computing systems has allowed for so called cloud computing. In this description and the following claims, "cloud computing" is defined as a model for enabling ubiquitous, convenient, on-demand network access to a shared pool of configurable computing resources (e.g., networks, servers, storage, applications, and services) that can be provisioned and released with reduced management effort or service provider interaction. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Some systems implement smart application sequencing and publishing. Sequencing is the process of converting an application into a virtual package and publishing is the process of making these virtual applications available to the end-user. In particular, applications can be virtualized and streamed to end users.

Application streaming is implemented where portions of an application's code, data, and settings are delivered as packages to a minimalistic light weight client when they are needed rather than the entire application being available at startup of the application. As noted, running a virtualized application may require the installation of a lightweight client version of the application. Packages are usually delivered over a web based protocol such as HTTP, CIFS, or RTSP.

Various challenges exist with respect to sequencing and publishing applications. One challenge is directed to setting up a sequencer workstation. Setting up a sequencer workstation entails significant overhead for the administrator as they need to satisfy a set of pre-requisites before they can start the sequencing process. For instance, the administrators may need to configure their workstations such as configuring the operating system (OS) to match the client target, making sure that their OS images are up to date and have latest patches on them, configuring temporary directories, shutting down anti-virus, firewall, and update applications etc. Setting the sequencer workstation often consumes valuable resources.

Another challenge relates to sequencing complex applications. Sequencing complex applications, such as large productivity suites, is often a cumbersome process. Package accelerators provide a simplified way of sequencing these applications by providing a predefined script or "recipe" for sequencing an application, yet most of the administrators are not able to take full advantage of them either due to lack of awareness of their existence or concerns regarding violating software agreements.

Another challenge relates to sequencing multiple applications in parallel. Currently there is no automated way of sequencing multiple applications in parallel.

Another challenge relates to storing virtual packages on a server. Once the sequencing is completed, the administrator is responsible for setting up the package on server for streaming. This means setting up server infrastructure and configuring an appropriate security model on the server.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a computing environment. The method includes acts for providing virtual applications from a remote based system based on native applications. The method includes, at a remote based system, receiving a native application from an on-premises system remote from the remote based system. The method further includes at the remote based system, sequencing the native application into a virtual application. The method further includes providing the virtual application to a system different than the remote based system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1A:
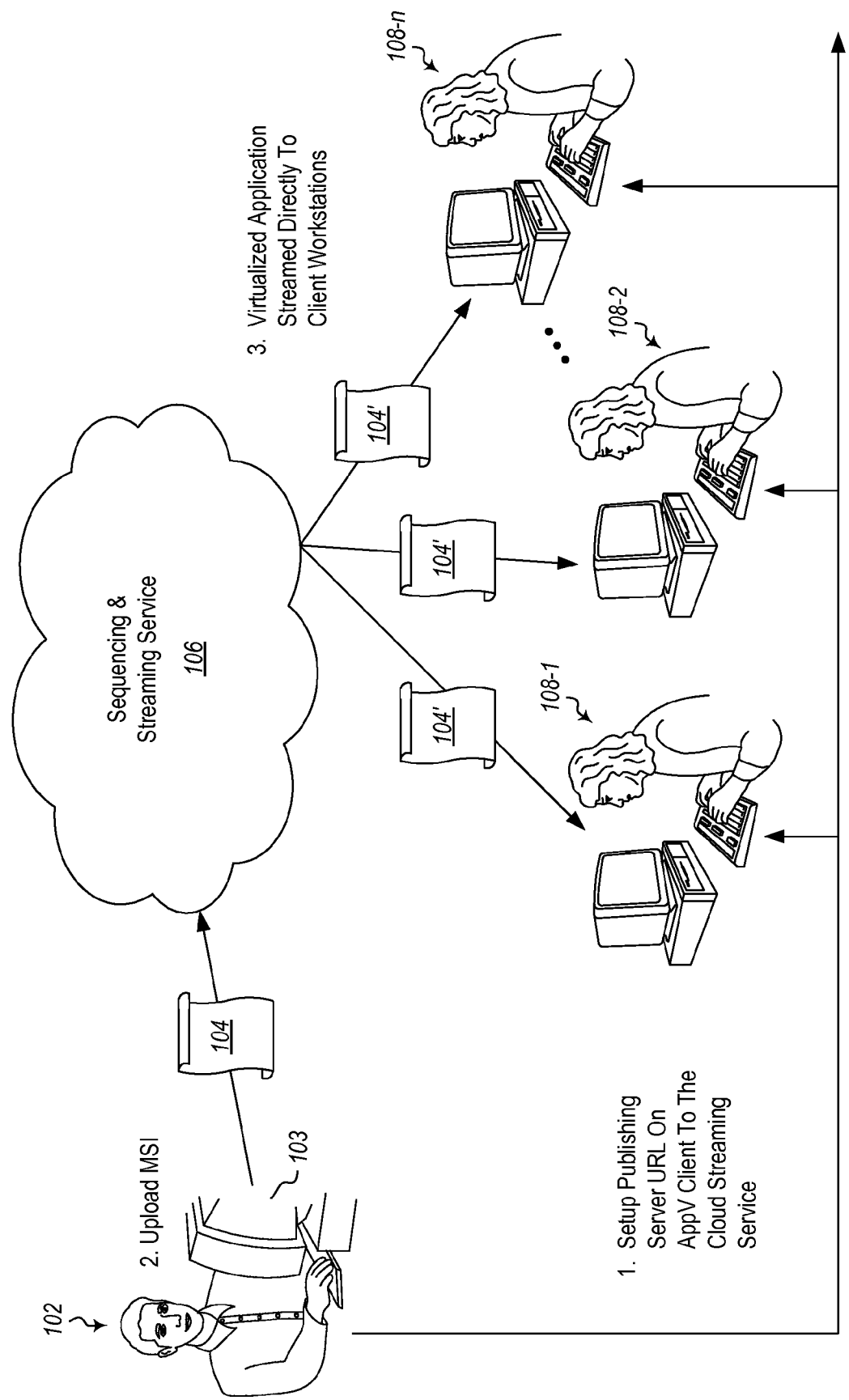
FIG. 1A illustrates a functional flow of a cloud based application.

Some embodiments may implement a hybrid service model where customer can sequence in the cloud (or more generically in a remote based environment) or seamlessly migrate existing sequenced packages to the cloud. Notably, as used herein, where examples are illustrated using the so-called "cloud", embodiments may be implemented generically in a remote based environment as illustrated above in the explanation of cloud based computing. Embodiments may alternatively or additionally implement publishing sequenced applications (both new and existing) from the cloud. Embodiments may alternatively or additionally implement automated state management and recycling of virtual machines. Embodiments may alternatively or additionally implement integration of the sequencing (both on-premise and on-cloud) with a package accelerator service.

Before elaborating on the implementation specifics, a more general treatment of the specific features of some embodiments is illustrated. As noted above, some embodiments include functionality for sequencing in the cloud. A sequencer, and the process of sequencing, monitors the installation and setup process for an application, and records the information needed for the application to run in a virtual environment. A sequencer can be used to configure which files and configurations are applicable to all users and which files and configurations users can customize By sequencing in the cloud, the administrator does not have to take the hit of the sequencing overhead of configuring the OS to satisfy pre-requisites because the sequencing service can automatically handle these tasks. As the sequencing is being done in the cloud, the sequencing service is responsible for using pre-created images which have the latest patches and/or software updates available on them. The sequencing service also handles installing the sequencer and fulfilling the sequencer pre-requisites before starting the sequencing. The user would essentially only need to feed an installation package, such as an MSI file or other installation package, and they will get back virtual packages. This would not only ensure that sequencing is done correctly by avoiding any manual errors but also save time and money which administrators would have spent in sequencing and configuring the sequencing the OS.

Embodiments may implement smart sequencing. The sequencing service is smart because it can determine if, for a given installer, a package accelerator is available. Package accelerators provide a simplified way of sequencing these applications by providing a predefined script or "recipe" for sequencing an application. The sequencing service can determine availability of accelerators by being integrated with a remote sequencing package accelerator service to make the determination if a package accelerator is already available in the cloud. If the customer chooses to use a package accelerator then the sequencing engine would use the package accelerator to aid in the sequencing. As the package accelerators would be picked up from a controlled environment, concerns about violating software agreements could be alleviated as there is an expectation of appropriate licenses having been obtained by the service provider.

Embodiments may implement parallel sequencings. The sequencing service in the cloud may be integrated with a smart state management service so that virtual machines (VMs) can be reused for carrying out sequencings. The smart management service would be responsible for reimaging a dirty VM in an automated fashion once sequencing has been completed on it. Once the smart management service has reimaged the VM, the sequencing service would automatically configure the VM for sequencing. Also the design of the sequencing service may be configured to allow multiple worker roles to carry out sequencing of different applications in parallel while maintaining a knowledge of their state.

Embodiments may include seamless migration of existing virtual packages to the cloud. A web front end can expose an interface so that the existing packages can be auto-imported to the cloud and are available to the administrator for management and publishing from the cloud.

Embodiments may include a hybrid sequencing and publishing environment. The sequencing service can expose an interface which would allow the user a greater degree of flexibility to choose between sequencing in the cloud and sequencing on-premises. Thereafter, even if the customer chooses to skip sequencing on the cloud, they can take advantage of publishing from the cloud. In an alternative embodiment, the customer can choose to sequence in the cloud and use their own on-premise server for publishing.

Referring now to FIG. 1A, a functional flow is illustrated. In particular, FIG. 1A illustrates a functional flow of a cloud-based application factory and publishing service. One main scenario that is supported includes an administrator 102 uploading a native application 104 to a cloud service 106. Agents exist on client machines 108-1, 108-2, through 108-*n* to stream virtualized applications from the cloud service 106. The cloud service 106 sequences the native application 104 to a virtual application 104' and publishes it to the client machines.

Figure 1B:
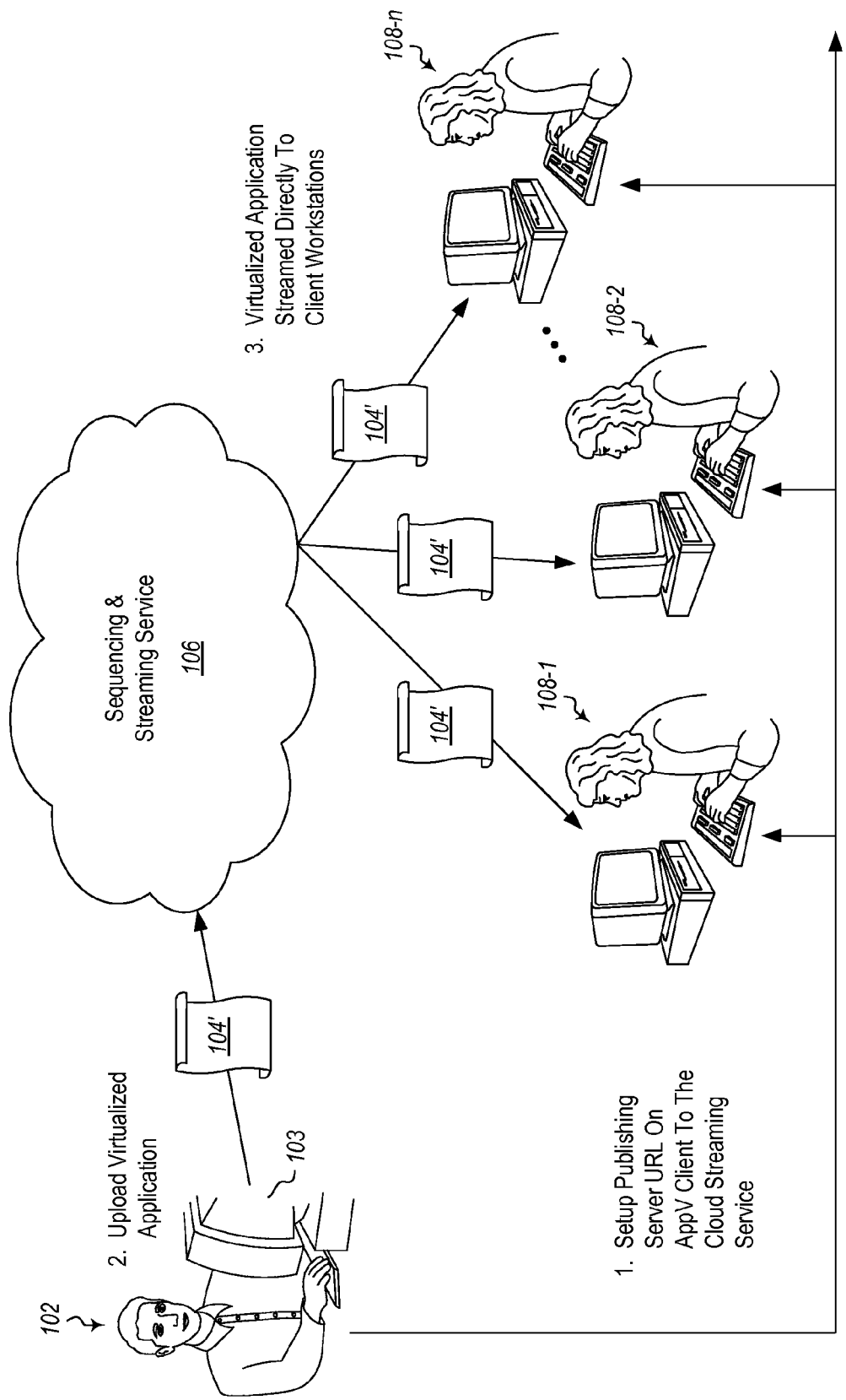
FIG. 1B illustrates another example of a functional flow of a cloud based application.

Various sub-scenarios for this main scenario exist. For example, as illustrated in FIG. 1B, in some embodiments, an administrator 102 uploads existing virtualized applications 104' directly to a publishing (or streaming) portion of the service 106. The virtualized applications 104' are then published to client machines (referred to generically as 108, but shown with specificity in FIGS. 1A and 1B at 108-1, 108-2, and 108-*n*). The service 106 provides the infrastructure for hosting and publishing the virtualized applications 104' to client machines 108.

Figure 1C:
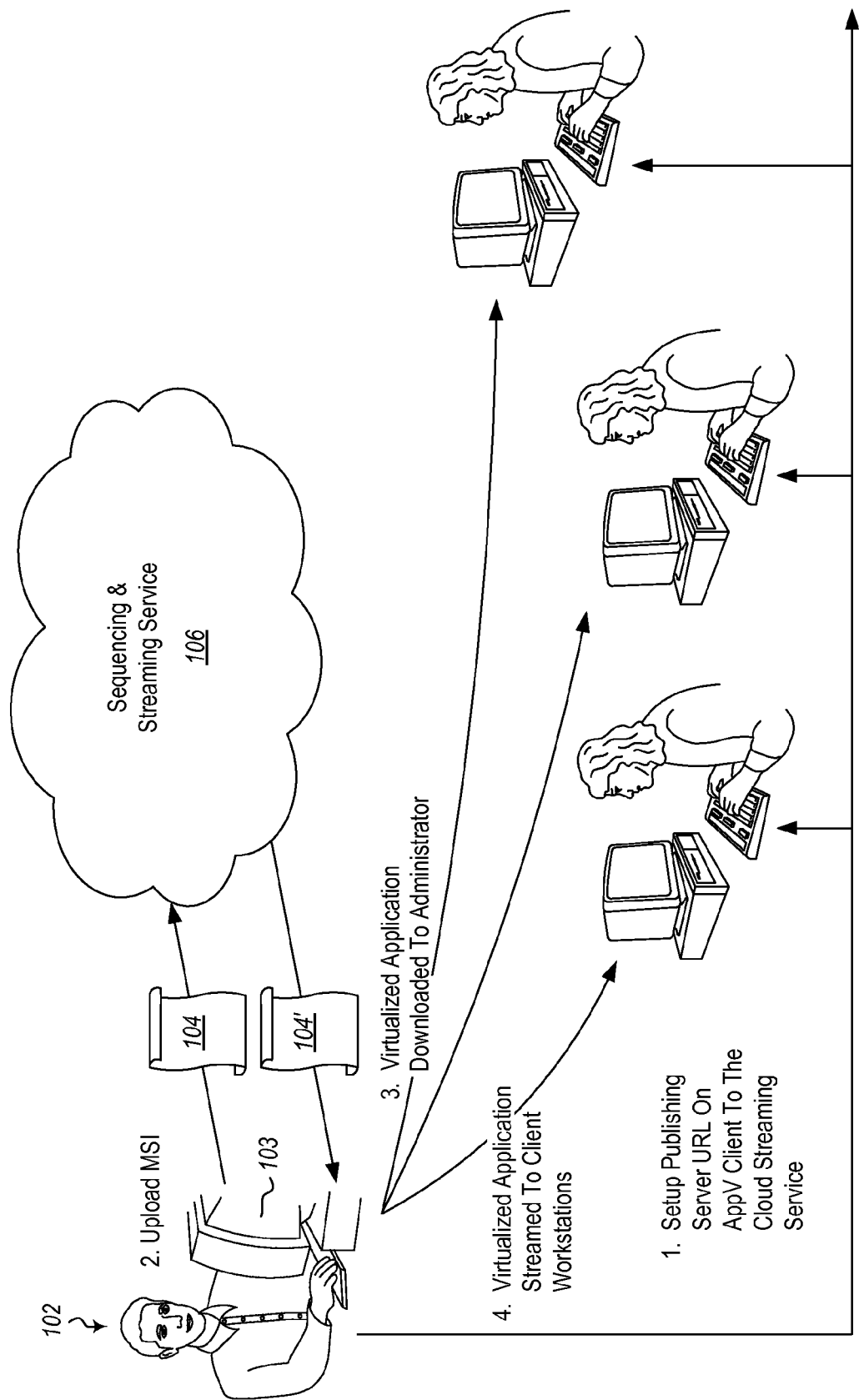
FIG. 1C illustrates another example of a functional flow of a cloud based application.

In another example sub-scenario illustrated in FIG. 1C, an administrator 102 uploads a native application 104 to the sequencing portion of the service 106 and downloads the virtualized application 104' (targeted to a specific version of client agent).

Embodiments may be implemented with logic built into a boxed sequencer to directly interface with a cloud based package accelerator service and to simplify sequencing of complex applications, such as by providing predefined scripts or "recipes". However, interfacing with the accelerator service is not limited to boxed sequencers. For example, sequencers in the cloud also interface with the package accelerator service.

Some embodiments may be implemented to provide sequencing on a pay-per application model/application-factory basis. For example, an administrator 102 can upload one or more applications 104 for sequencing and payment would be made for the number of applications sequenced into virtual applications 104'. Customers (e.g. the administrator 102) can directly download a virtualized application based on a specific licensing model applicable to the customer.

Figure 2:
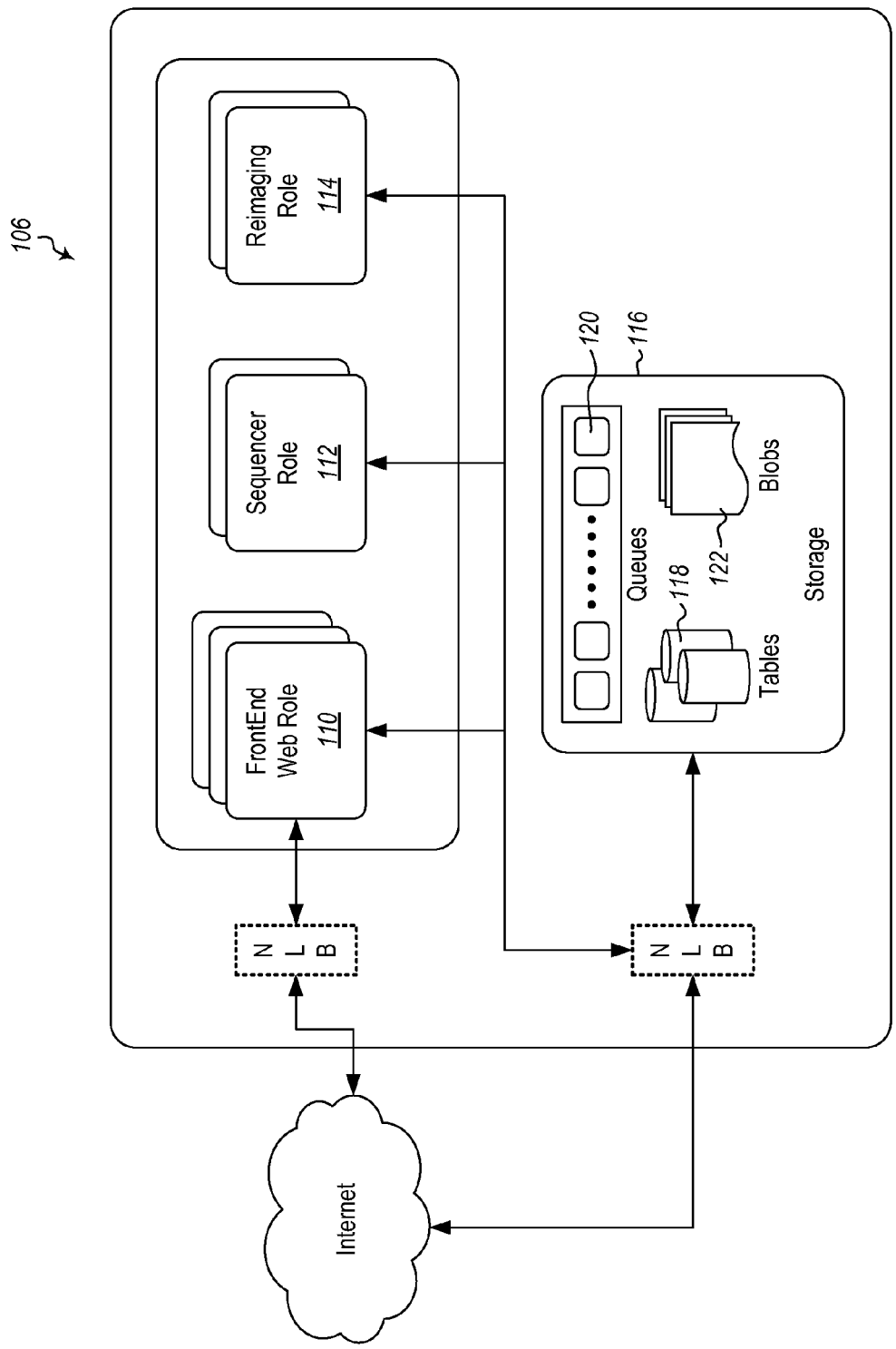
FIG. 2 illustrates a block diagram illustration of an application factory and publishing service.

Referring now to FIG. 2, a block diagram illustration of the application factory and publishing service 106 hosted in the cloud is shown. The application factory and publishing service 106 comprises three core components. Namely, the service includes a web front-end 110, a sequencer role 112, and a reimaging role 114. In addition to the above core components, embodiments may also include accelerator logic to simplify the sequencing of complex packages. This is implemented as a web service which provides package accelerators to on-premise sequencer services and/or cloud based sequencer services.

The web front-end 110 is the component with which a user, such as an administrator 102 (see FIGS. 1A-1C) directly interacts with. It provides various functionalities. In particular, the web front-end 110 provides a web application for uploading native application installers so that they can be converted into virtualized applications and streamed to the virtualized application client. The web front-end 110 provides a web application for uploading pre-sequenced virtualized packages to the cloud. The web front-end 110 provides a web service that hosts virtualized applications for streaming to clients 108 (see FIG. 1A). The web front-end 110 component communicates with other parts of the system 106 via cloud storage 116, which may include tables 118, queues 120 and blobs 122.

The following illustrates additional details regarding the sequencer role 112. Once native applications 104 (see FIG. 1A) are uploaded to the service 106 they are converted into virtualized packages 104' by a sequencing component so that they can be streamed to the client 108. This sequencing is done on a sequencer role 112. Additional details are illustrated with reference to FIG. 3. The web front end 110 communicates with the sequencer role 112 using a queue 120-1 where it sends a message containing the package name, the package installer, if a search for a package accelerator should be performed, and (if applicable) the package accelerator used during sequencing. A fresh reimaged sequencer instance 112-1 or 112-2 which has a clean state (on which no prior sequencing has been done after reimaging, as explained in more detail below) would pick up the message and start the sequencing of the application 104. Once sequencing has started on a sequencer instance, e.g., 112-2, it will mark itself as dirty so that it cannot sequence any more applications until it has been reimaged. The process of reimaging is an automated process requiring no user intervention as is discussed in more detail below. The usage of queues, referred to generically as 118, and automated imaging allows multiple applications to be sequenced in parallel by different sequencer instances, referred to generally as 112, and in an automated fashion.

Figure 4:
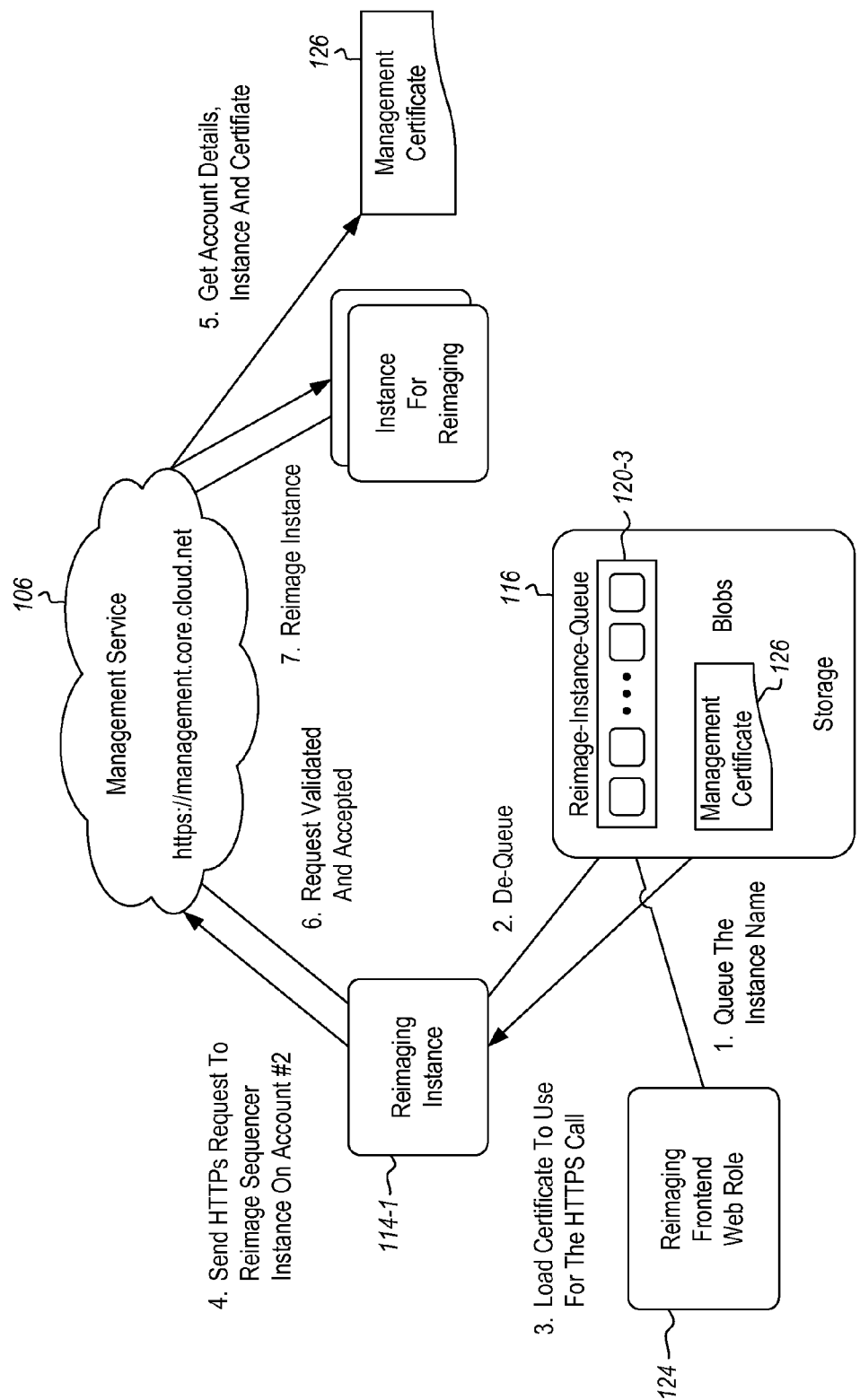
FIG. 4 illustrates details regarding a re-imaging role.

Referring now to FIG. 4, additional details regarding the re-imaging role 114 illustrated in FIG. 2 are illustrated. Sequencing is typically done on a computer that is in a known state. This is most easily accomplished on a computer that does not have multiple applications installed or running on the system. For this reason a virtual machine hosting a sequencing instance can be re-imaged after each sequencing cycle. This is achieved by maintaining a queue 120-3 of instance IDs that correspond to sequencer virtual machines. FIG. 4 illustrates a reimaging flow.

FIG. 4 illustrates at 1, an act of queuing an instance name. For example, a unique identifier identifying a virtual machine instance previously used to sequence an application can be added to a queue 120-3. At 2, an act of de-queuing is illustrated. For example, as illustrated, the reimaging instance 114-1 may de-queue the identifier from the queue 120-3. At 3, an act of loading a certificate to use for an HTTPS call is illustrated. For example, a certificate 126 for use with the service 106 can be loaded. At 4, an act of sending an HTTPS request to a cloud based service management API is illustrated. For example, a request for reimaging of a VM can be sent to the service 106. At 5, an act of getting account details, instance and certificate is illustrated. At 6, an act of validating and accepting a request is illustrated. At 7, an act of reimaging an instance is illustrated. For example, a VM previously used for sequencing may be reimaged.

The reimaging service works as shown above, by invoking the cloud based service management API to re-image a particular instance based on the queue populated by the sequencer role. In particular, the reimaging may be performed using functionality native to a cloud based service 106.

Figure 5:
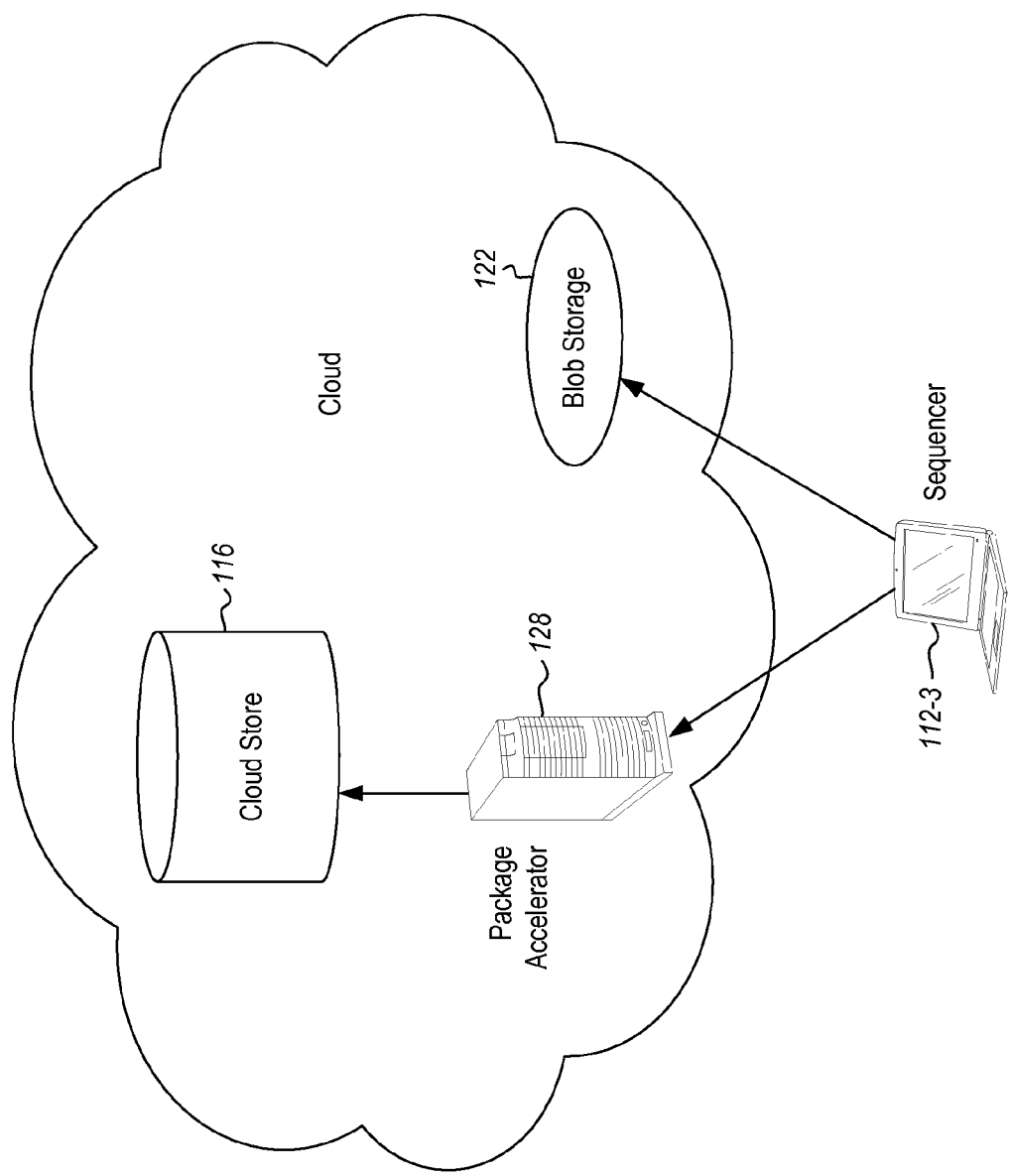
FIG. 5 illustrates details regarding a package accelerator.

Referring now to FIG. 5, embodiments may also implement a package accelerator service 128. A sequencer 112-3, either running on a worker role in the cloud service 106 (i.e. on a remote based service) or on-premise (i.e. at a local based service local to an enterprise) can also be integrated with a package accelerator service 128. If a customer wishes to use a package accelerator service then the sequencer 112-3 can query the package accelerator service 128 for any package accelerators that can be used to accelerate the sequencing process. Package accelerators provide a simplified way of sequencing these applications by providing a predefined script or "recipe" for sequencing an application. A package accelerator service 128 is a web service deployed to the cloud based service 106 that stores information about known package accelerators along with the information about the applications and installers for which they can be used. The service itself can be implemented in a very straightforward fashion as only basic CRUD (Create Read Update Delete) operations may be required in some embodiments.

A package accelerator service 128 will store information about package installers in the cloud storage 116. Use of the package accelerator service 128 is now illustrated in additional detail. A user uploads an installer and affirms that they want to use the package accelerator service 128. A sequencer 112-3 on the worker role (or an on-premises system 103) extracts information about the installer such as, for example, an installer hash, an application name, a product name, a product version, etc. The sequencer 112-3 sends this information to package accelerator service 128. The package accelerator service 128 performs a search, based on the information, to identify any package accelerators and returns any found accelerator information identifying any package accelerators that may be used for sequencing. One or more of the found package accelerators may be downloaded to a temporary location. The package accelerator flow of any downloaded package accelerators on sequencer is then initiated.

An interface defining the package accelerator service 128 exposes methods for adding and retrieving package accelerators and enumerating any existing set of package accelerators. If no package accelerators are found, then an existing sequencing flow monitoring the application when it is being sequenced is followed.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 6:
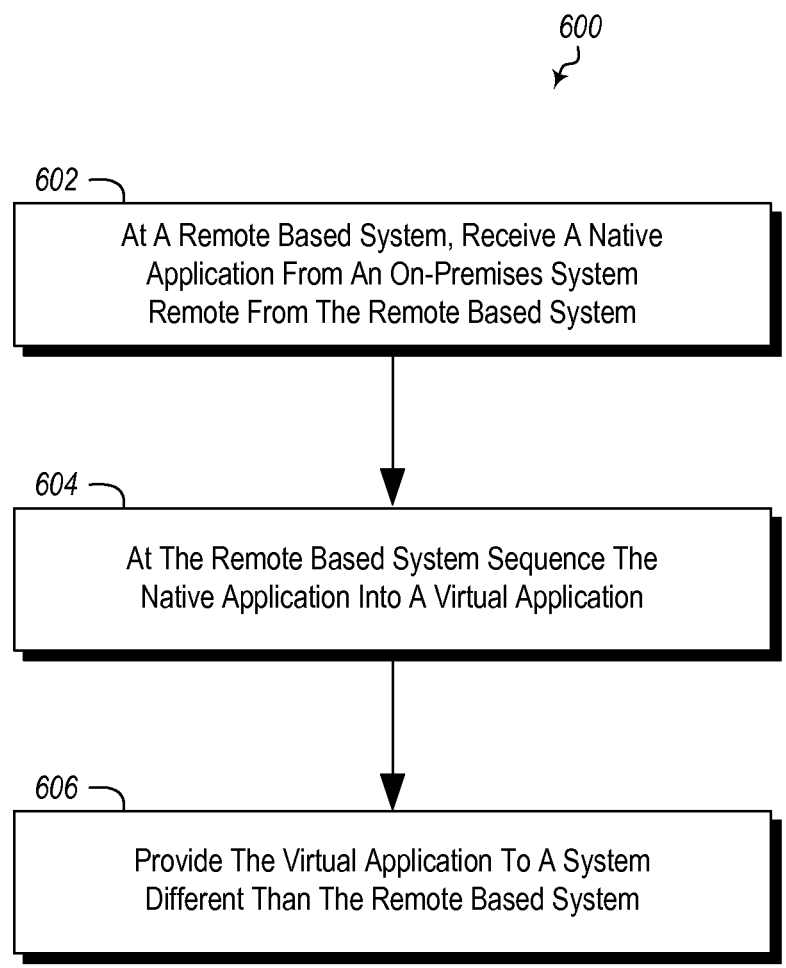
FIG. 6 illustrates a method of providing virtual applications from a remote based system based on native applications.

Referring now to FIG. 6, a method 600 is illustrated. The method 600 includes acts for providing virtual applications from a remote based system based on native applications. The method 600 includes at a remote based system, receiving a native application from an on-premises system remote from the remote based system (act 602). For example, FIG. 1A illustrates a service 106 receiving a native application 104 from an administrator 102 at an on-premises system 103. Illustratively, an on-premises system may be a system in close physical proximity to an enterprise. For example, the on-premises system may be located, physically, in the same location as the administrator 102. The remote based system (e.g. the service 106) may be located physically remote from the administrator 102. In particular, the remote based system may be a system that is located and connected that a number of different enterprises, each with their own on-premises systems, can connect to the remote based system.

The method 600 further includes at the remote based system sequencing the native application into a virtual application (act 604). For example, as illustrated in FIG. 2, a sequencer role 112 at the remote based system 106 may be used to sequence a native application 104 (see FIG. 1A) to a virtual application 104'. The sequencer role 112 may sequence the application 104 by installing and setting up the application for use and monitoring the installation and setup process for the application 104. The sequencer role 112 records information needed for the application 104 to run in a virtual environment.

The method 600 further includes providing the virtual application to a system different than the remote based system (act 606). For example, as illustrated in FIG. 1A, a virtual application 104' can be provided to client machines 108. Alternatively, as illustrated in FIG. 1C, the virtual application 104' can be provided back to the on-premises system 103 to the administrator 102.

As noted above, and as illustrated in FIG. 1A, the method 600 may be practiced where providing the virtual application to a system different than the remote based system comprises streaming the virtual application to one or more clients. Also noted above, and illustrated in FIG. 1C, in an alternative embodiment, the method 600 may be practiced where providing the virtual application to a system different than the remote based system comprises returning the virtual application to the on-premises system.

The method 600 may be practiced where sequencing the native application into a virtual application is performed by a virtual machine. Such embodiments may further include the virtual machine marking itself as dirty as a result of performing the sequencing operation. This can be used to cause the virtual machine to be reimaged prior to being used for a subsequent sequencing operation on another virtual application.

The method 600 may be practiced where sequencing the native application into a virtual application is performed by a virtual machine. Such embodiments may further include reimaging the virtual machine used to sequence the native application into the virtual application. In particular, this allows a "clean" machine without lingering settings or data to be used to perform sequencing operations.

The method 600 may further include examining the native application to be virtualized. Based on examining the native application, embodiments may include performing a search for one or more accelerators that can be used to sequence the native application to a virtual. The accelerators include scripts defining a set of sequencing actions that can be used to accelerate the act of sequencing the native application into a virtual application. In general, the method 600 may include performing sequencing acceleration using one or more predefined accelerators.

Figure 3:
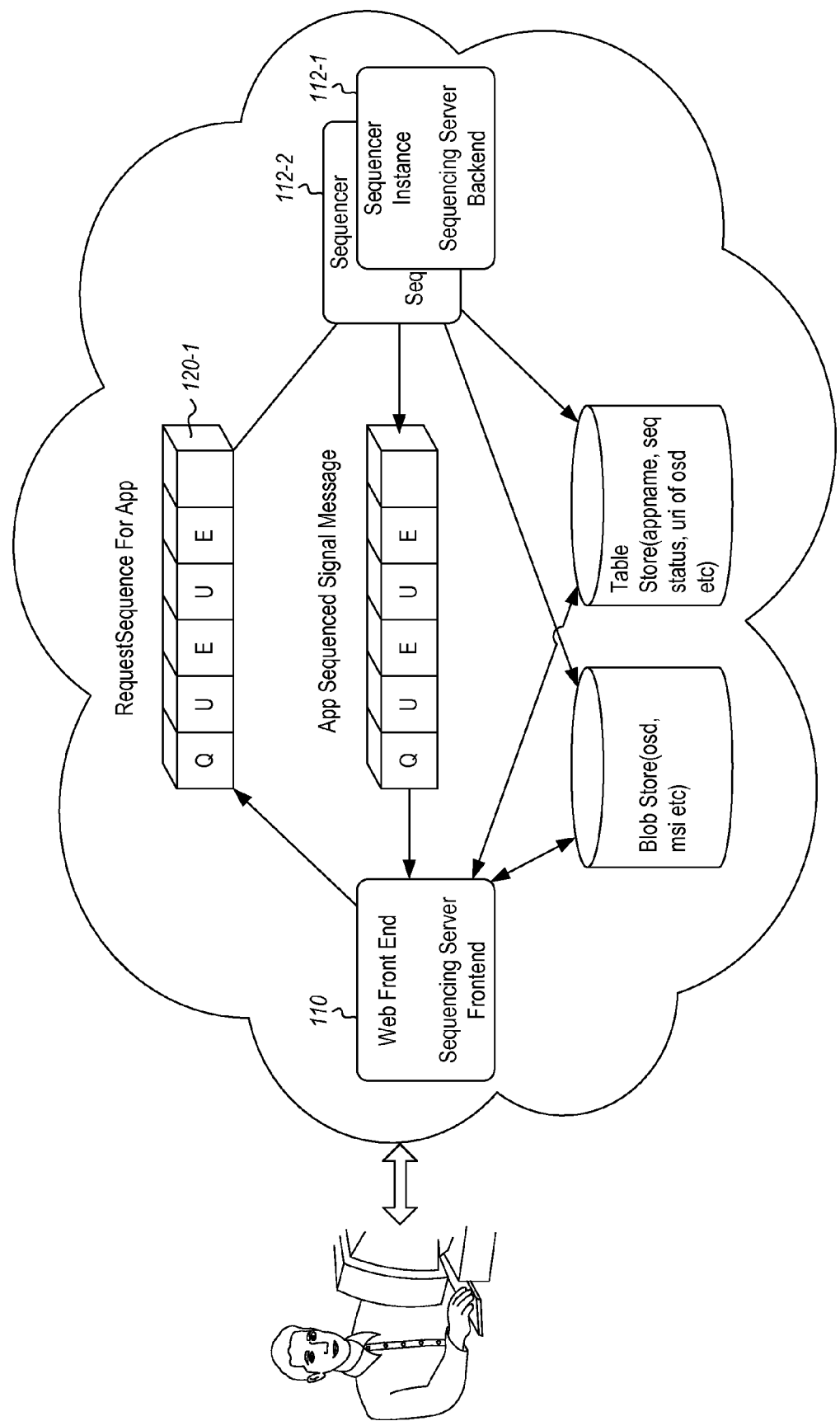
FIG. 3 illustrates details regarding a sequencer role.

Some embodiments of the method 600 may be practiced where different roles of the remote based system communicating through remote based storage. Examples of this are illustrated in FIG. 3, which illustrates communication through queues, such a queue 120-1.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of providing virtual applications from a remote based system based on native applications, the method comprising:
   at a remote based system, receiving a native application from an on-premises system remote from the remote based system;
   at the remote based system using a virtual machine to perform sequencing the native application into a virtual application by installing and setting up the application for use and monitoring the installation and setup process for an application, and recording information needed for the application to run in a virtual environment;
   providing the virtual application to a system different than the remote based system; and
   reimaging the virtual machine used to perform the sequencing.

2. The method of claim 1, wherein providing the virtual application to a system different than the remote based system comprises streaming the virtual application to one or more clients.

3. The method of claim 1, wherein providing the virtual application to a system different than the remote based system comprises returning the virtual application to the on-premises system, that provided the virtual application to the remote based system, remote from the remote based system.

4. The method of claim 1, the method further comprising the virtual machine marking itself as dirty as a result of the sequencing.

5. The method of claim 1, further comprising:
   examining the native application to be virtualized; and
   based on examining the native application, performing a search for one or more accelerators that can be used to sequence the native application to a virtual application, the accelerators comprising scripts defining a set of sequencing actions that can be used to accelerate the act of sequencing the native application into a virtual application.

6. The method of claim 1, further comprising performing sequencing acceleration using one or more predefined accelerators, the accelerators comprising scripts defining a set of sequencing actions that can be used to accelerate the act of sequencing the native application into a virtual application.

7. The method of claim 1, further comprising different roles communicating through remote based storage.

8. A computing system for providing virtual applications from a remote based system based on native applications, the computing system comprising:
   one or more processors; and
   one or more computer readable media, wherein the one or more computer readable media comprise computer executable instructions that when executed by at least one of the one or more processors cause at least one of the one or more processors to perform the following:
   at a remote based system, receiving a native application from an on-premises system remote from the remote based system;
   at the remote based system sequencing the native application into a virtual application with a virtual machine;
   providing the virtual application to a system different than the remote based system; and
   marking the virtual machine as dirty in such a way as to cause the virtual machine to be reimaged prior to being used for a subsequent sequencing operation on another virtual application.

9. The computing system of claim 8, wherein providing the virtual application to a system different than the remote based system comprises streaming the virtual application to one or more clients.

10. The computing system of claim 8, wherein providing the virtual application to a system different than the remote based system comprises returning the virtual application to the on-premises system, that provided the virtual application to the remote based system, remote from the remote based system.

11. The computing system of claim 8, the method further comprising reimaging the virtual machine.

12. The computing system of claim 8, the computer readable media further comprising computer executable instructions that when executed by at least one of the one or more processors cause at least one of the one or more processors to perform the following:
   examining the native application to be virtualized; and
   based on examining the native application, performing a search for one or more accelerators that can be used to sequence the native application to a virtual application, the accelerators comprising scripts defining a set of sequencing actions that can be used to accelerate the act of sequencing the native application into a virtual application.

13. The computing system of claim 8, the computer readable media further comprising computer executable instructions that when executed by at least one of the one or more processors cause at least one of the one or more processors to perform sequencing acceleration using one or more pre-defined accelerators, the accelerators comprising scripts defining a set of sequencing actions that can be used to accelerate the act of sequencing the native application into a virtual application.

14. The computing system of claim 8, the computer readable media further comprising computer executable instructions that when executed by at least one of the one or more processors cause at least one of the one or more processors to cause different roles to communicate through remote based storage.

15. A hardware storage device storing computer executable instructions that, when executed by one or more processors, cause at least one of the one or more processors to perform the following:
   at a remote based system, receiving a native application from a system remote from the remote based system;
   at the remote based system sequencing the native application into a virtual application with a virtual machine;
   providing the virtual application to a system different than the remote based system; and
   marking the virtual machine in such a way as to cause the virtual machine to be reimaged as a result of the sequencing.

* * * * *